US012587269B1

(12) United States Patent
Subramanian et al.

(10) Patent No.: US 12,587,269 B1
(45) Date of Patent: Mar. 24, 2026

(54) SYSTEM FOR MODEM ARRAY FAULT TOLERANCE

(71) Applicant: AMAZON TECHNOLOGIES, INC., Seattle, WA (US)

(72) Inventors: Sharanya Subramanian, Fremont, CA (US); Murali Krishnan, San Diego, CA (US); Sergii Vystoropskyi, Bellevue, WA (US); Prashant Bhargava, Austin, TX (US); Nicholas Dean Walker, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 324 days.

(21) Appl. No.: 18/509,865

(22) Filed: Nov. 15, 2023

(51) Int. Cl.
    *H04B 7/185*     (2006.01)
    *H04B 7/204*     (2006.01)

(52) U.S. Cl.
    CPC ..... *H04B 7/18513* (2013.01); *H04B 7/18526* (2013.01); *H04B 7/2041* (2013.01)

(58) Field of Classification Search
    CPC ............ H04B 7/18513; H04B 7/18526; H04B 7/18523; H04B 7/1851; H04B 7/185; H04B 7/2041; H04B 7/18576
    See application file for complete search history.

(56) References Cited

U.S. PATENT DOCUMENTS

| | | | | |
|---|---|---|---|---|
| 11,671,162 B1 * | 6/2023 | McCormick | ........... | H04B 1/126 |
| | | | | 370/278 |
| 2018/0176656 A1 * | 6/2018 | Baudoin | .............. | H04B 7/2041 |

OTHER PUBLICATIONS

"VSAT Linear Polarisation: A Beginner's Guide", Satoms, Tech Blog, Dec. 5, 2017, 6 pgs. Retrieved from the Internet: URL: https://satoms.com/vsat-xpol-and-co-pol-information-and-commissioning/.
Gustlin et al., "Interlaken Technology: New-Generation Packet Interconnect Protocol", Interlaken, White Paper, Cisco Systems, Mar. 7, 2007, 16 pgs. Retrieved from the Internet: URL: https://web.archive.org/web/20220121224848/https:/www.cortina-systems.com/images/documents/400023_Interlaken_Technology_White_Paper.pdf.

* cited by examiner

*Primary Examiner* — Keith Ferguson
(74) *Attorney, Agent, or Firm* — Lindauer Law, PLLC

(57) ABSTRACT

A gateway uplink to a satellite may use cross-polarization interference cancellation (XPIC). The uplink may utilize two frequencies, each using XPIC. Data may be transferred by these four avenues: two polarizations and two frequencies. Onboard the satellite, radio-frequency front end hardware detects the signal and produces as output in-phase (I) and quadrature (Q) data for each frequency and polarization. First IQ data is processed by a first pair of modems and second IQ data is processed by a second pair of modems. Each pair of modems processes the respective IQ data to implement XPIC. The first pair is connected to a network processor. The second pair is daisy-chained via the first pair to the network processor. During a failure in the first pair, XPIC ceases and connections previously used to exchange IQ data are used to transfer network data between the second pair and then to the network processor.

20 Claims, 5 Drawing Sheets

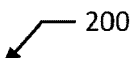

200

STRUCTURAL SYSTEM 202

CONTROL SYSTEM 204

FLIGHT CONTROL PROCESSOR(S) 220

TRACKING, TELEMETRY, CONTROL SYSTEM 222

POWER MANAGEMENT AND DISTRIBUTION (PMAD) SYSTEM 224

POWER SYSTEM 206

PHOTOVOLTAIC ARRAY(S) 230

PV ARRAY ACTUATOR(S) 232

BATTERY(S) 234

MANEUVERING SYSTEM 208

REACTION WHEEL(S) 240

THRUSTER(S) 242

MAGNETIC TORQUE ROD(S) 244

PULSE PER SECOND SYSTEM 214

BUS(ES) 216

SENSOR(S) 210

ENGINEERING CAMERA(S) 250

ACCELEROMETER(S) 252

GYROSCOPE(S) 254

GNSS 256

STAR TRACKER(S) 258

COARSE SUN SENSOR 260

COMMUNICATION SYSTEM 212

INTERSATELLITE LINK FPGA(S) 270

ISL TRANSCEIVER(S) 272

GATEWAY UPLINK

GATEWAY ANTENNA(S) 166

RF FRONT END(S) 168

MODEM(S) 170

NETWORK PROCESSOR(S) 172

MODEM(S) 276

GATEWAY DOWNLINK TRANSMITTER(S) 280

UT SERVICE ANTENNAS 282

UT DOWNLINK TRANSMITTER(S) 284

UT UPLINK RF FRONT END(S) 286

FIG. 2

SYSTEM FOR MODEM ARRAY FAULT TOLERANCE

BACKGROUND

A satellite may receive data from a gateway.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 2 is a block diagram of some systems associated with the satellite, according to some implementations.

Figure 1:
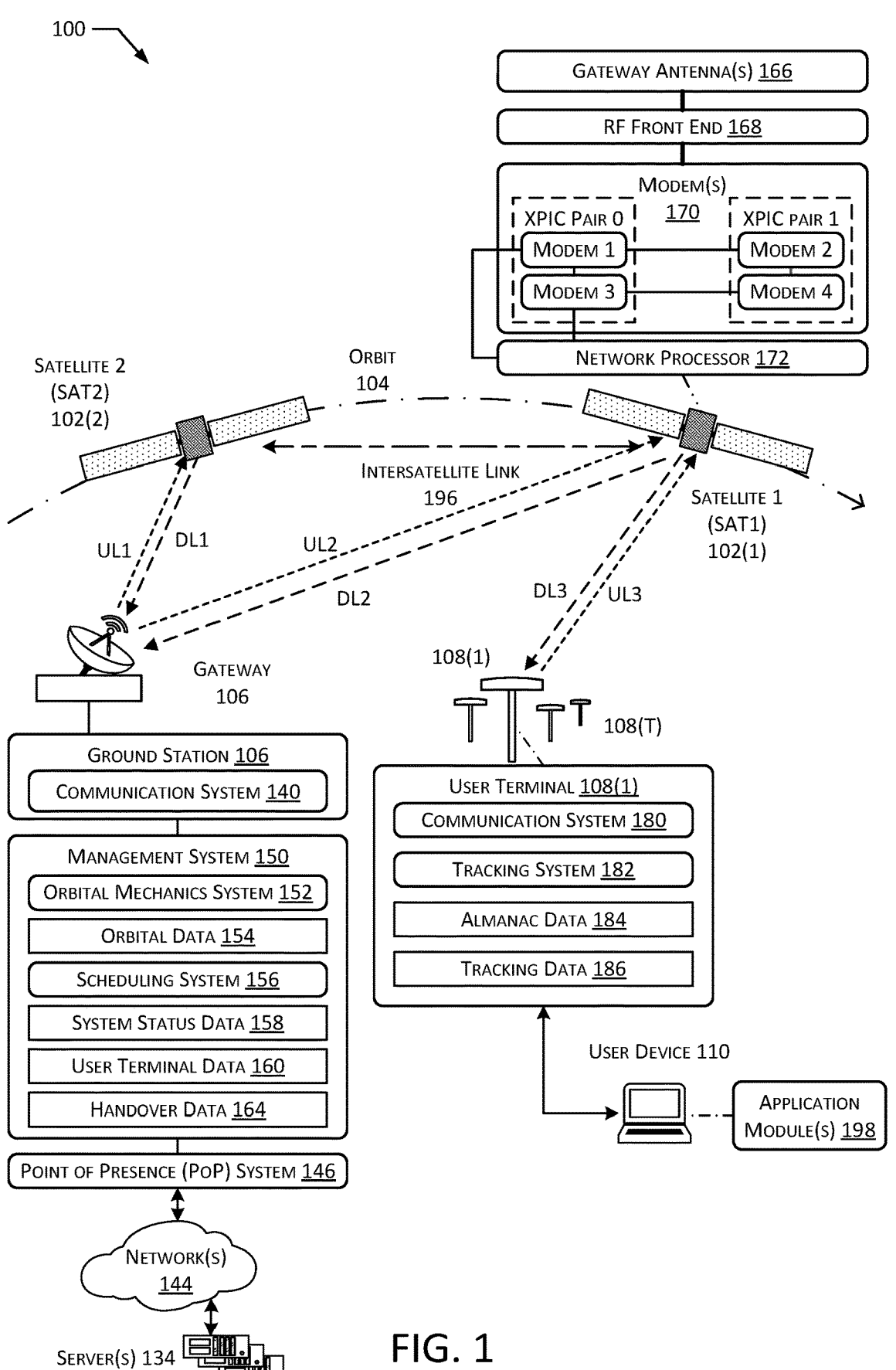
FIG. 1 illustrates a system for providing fault tolerance in a modem array onboard a satellite, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and gateways that in turn connect to other networks, such as the Internet. The satellites provide communication services between gateways and devices, such as user terminals (UT) located on or near a body such as the Earth. For example, a first UT at a first geographic location (geolocation) on the Earth may send upstream data to a first satellite that is in range of the first UT. The first satellite may send the upstream data to a gateway, another satellite, and so forth. For example, the first satellite may send the upstream data to a gateway that in turn sends the upstream data to a point-of-presence (PoP). The PoP may then send the upstream data to a device on another network, such as a server on the Internet.

Likewise, downstream data destined for the first UT may be received at the PoP. The PoP sends the downstream data to the gateway that in turn uses a gateway uplink to send the downstream data to the first satellite. The first satellite then sends the downstream data to the first UT.

For ease of illustration, and not necessarily as a limitation, a satellite may be deemed "in range" of a station such as a gateway or UT when communication may take place with that station. For example, a satellite may be in range when it is within line of sight of the gateway, a distance between the satellite and the gateway is less than a threshold distance, the gateway is within a footprint of an antenna onboard the satellite, and so forth. One of the factors that determines how long a satellite is within range of the station is an orbital period of the satellite, that is determined by the altitude of the satellite. A ground contact window describes the time interval during which the gateway and the satellite are in range, and a gateway uplink may be provided to the satellite.

The period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular station for only a few minutes. This results in a station being frequently handed off from one satellite to another to maintain continuous communication services. In comparison, a geosynchronous satellite has an orbital period that coincides with the rotation of the Earth, so a geosynchronous satellite appears to remain motionless with respect to the Earth. While the apparent motionlessness with respect to the station removes the need for handoffs, other drawbacks associated with the geosynchronous satellite remain.

Signals between the station and the satellite are limited to travelling at the speed of light. The farther away a satellite is from the station, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving an NGO satellite at an altitude of 600 km only introduces about 4 ms of latency comprising 2 ms up to the satellite and 2 ms down to the station. However, the latency does vary as distance to the NGO satellite changes. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the station and the satellite allow for increased station density by allowing greater frequency re-use and sharing. Power and antenna gain requirements for both the station and the satellites are also reduced due to the shorter distances, compared to communication using geosynchronous satellites. This allows for relatively smaller and less expensive satellites to be used.

To maximize data throughput, various techniques may be used. Frequency multiplexing may involve using different frequencies at the same time, each frequency carrying a portion of the data to be transferred. Various techniques, such as filters, may be used to keep signals on different frequencies from interfering with one another. On a single frequency, different polarizations may also be used to carry part of the data to be transferred. For example, a left-hand circularly polarized (LHCP) signal may be used to carry some data, while a right-hand circularly polarized (RHCP) signal may be used to carry some data with a technique known as cross-polarization (XPOL). Because there may be some interference that results between these polarizations, a technique known as cross-polarization interference cancellation (XPIC) may be used to mitigate this interference. The XPIC process uses information about the signals for both polarizations to reduce or eliminate interference. This information may be expressed as in-phase (I) and quadrature (Q) data, together known as IQ data that represent the modulations of a carrier, independent of the frequency.

A modem is a device that accepts an analog signal, or a digital representation thereof, and demodulates the signal to provide data as output. To facilitate XPIC, a pair of modems may be used. For example, a signal at a first frequency may be processed by a radio-frequency (RF) front end to determines samples representative of a waveform of one or more carriers at the first frequency and a respective polarization. These samples may then be processed to determine IQ data that is associated with the respective polarization. The pair of modems may exchange their respective IQ data, and use the combined information to each demodulate the data conveyed by their respective polarization. In a system using more than one frequency, additional pairs of modems may be used in this fashion.

Onboard a satellite, an array of modems may be used, with the array comprising pairs of modems to facilitate XPIC at different frequencies. A network processor is in communication with the modems. The network processor may perform monitoring and control functions to direct operation of the modems. The network processor may also accept the demodulated data produced by a modem and pass that data on to other systems. For example, the demodulated data may be sent from the network processor to a router. The router in turn may enque data for transmission via downlink to a particular UT.

As the array of modems includes more than one pair of modems, various architectures may be used to provide communication between the modems and the network processor. In one implementation, each modem may utilize a separate and direct data connection to the network processor. However, this may not be feasible. For example, one or more of the devices may not have enough available communication ports to support this architecture, there may be insufficient space or volume for electrical circuit traces or optical waveguides, and so forth.

The limitation on the number of available communication ports for respective devices such as modems and network processors may be exacerbated onboard a satellite in which hardware-level redundancy is implemented. For example, if the satellite includes redundant network processors, ports on the modem are used to connect to the main and redundant network processor, reducing the number of ports available to connect to the modems.

In one implementation, this limitation may be addressed by connecting two or more modems in series, or "daisy-chaining". For example, the network processor is connected to a first modem using a first data connection. The first modem is connected to a second modem using a second data connection. Data may be transferred between the second modem and the network processor via the first and second data connections.

As described above, during normal operation a pair of modems may be used to provide XPIC. Each pair of modems may have a data connection that may be used to transfer the IQ data used to perform the XPIC. Individual modems across pairs may be daisy-chained as described. For example, a first modem is daisy-chained to a second modem and a third modem is daisy-chained to a fourth modem. The first modem and the third modem during normal operation may operate as a first pair performing XPIC while the second modem and the fourth modem operate as a second pair performing XPIC.

In some circumstances a modem or a portion thereof may exhibit a failure. In some failure modes, while in the configuration associated with normal operation, the second or fourth modem may be left without communication to the network processor. This may impair operation of the system, as the network processor may be left unable to communicate with those modems and perform diagnostic operations, modify operation of the modem, receive demodulated data, and so forth.

In the event of a failure, mitigating actions may be taken to attempt to resolve the failure. For example, a modem or portion thereof may be re-initialized. However, such operations may result in a temporary loss of all communications functions. As a result, it may not be feasible to perform such mitigating actions immediately, in favor of deferring until the temporary loss may be accommodated. For example, it may be beneficial to defer mitigating actions until after conclusion of a current ground contact window.

Described in this disclosure are techniques and systems to dynamically re-allocate data connections between modems to maintain communication in the event of a failure of a modem. If a failure involving communication between one of the modems and the network processor is detected, the modems may transition to a failover configuration. In the failover configuration, XPIC on modems within the daisy-chain of the failure is discontinued. The data connection previously used to transfer IQ data is re-purposed and used to transfer network data from the modem affected by the failure, around the failed modem, to the operational modem in the pair. The operational modem in turn transfers data to the network processor via its data connections.

While in the failover configuration, data throughput may be reduced compared to the normal operating configuration. For example, the loss of the XPIC may require a change in modulation/coding of the signal, reducing the amount of data received per unit of time. For example, the satellite may report the failure and the transmitting system at the gateway may change the modulation/coding, discontinue cross-polarization modulation, and so forth. While in the failover configuration, the satellite maintains the ability to continue receiving data from the gateway, albeit at a reduced rate. This provides a more graceful degradation in performance, compared to a complete loss of service. The failover configuration may be implemented extremely quickly, minimizing effects on data transfer.

By using these techniques and systems, the satellite is able to continue to provide communication service in the event of a failure. This improves overall reliability and increases system uptime.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with its antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a gateway 106, user terminals (UTs) 108, and user devices 110. Each user device 110 may execute one or more application modules 198. For example, the application modules 198 may comprise email applications, telephony applications, videoconferencing applications, telemetry applications, web browser applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

With regard to FIG. 1, the uplink is a communication link which allows data to be sent from a gateway 106 to a satellite 102, from a UT 108 to the satellite 102, or from another device to the satellite 102. Uplinks are designated as UL1, UL2, UL3 and so forth. For example, UL1 is a first uplink from the gateway 106 to the second satellite 102(2). In comparison, a downlink is a communication link which allows data to be sent from the satellite 102 to a gateway 106, UT 108, or device other than another satellite 102. For example, DL1 is a first downlink from the second satellite 102(2) to the gateway 106. The satellites 102 may also be in communication with one another. For example, an intersatellite link (ISL) 196 provides for communication between satellites 102 in the constellation.

One or more gateways 106 are in communication with one or more satellites 102. The gateways 106 may pass data between the satellites 102, a management system 150, networks 144 such as the Internet, and so forth. The gateways 106 may be emplaced on land, on vehicles, at sea, and so forth. Each gateway 106 may comprise a communication system 140. Each gateway 106 may use the communication system 140 to establish communication with one or more satellites 102, other gateways 106, and so forth. The gateway 106 may also be connected to one or more communication networks 144. For example, the gateway 106 may connect to a terrestrial fiber optic communication network 144.

The gateway 106 may act as a network gateway, passing data between the one or more communication networks 144 and the satellites 102. Such data may be processed by the gateway 106 and communicated via the communication system 140. The communication system 140 of a gateway 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

In some implementations, the gateway uplink to the satellite 102 may utilize various techniques such as transmitting different signals using the same frequency and different polarizations, transmitting several signals on different frequencies, and so forth. These techniques may be used to increase the amount of data that may be transmitted from the gateway 106 to the satellite 102 per unit of time.

Onboard the satellite 102, corresponding hardware allows for the reception and demodulation of the data transmitted on the gateway uplink. The satellite 102 may comprise one or more gateway antennas 166. For example, each satellite 102 may have two gateway antennas 166, each comprising a parabolic antenna. These gateway antennas 166 may be connected to one or more radio-frequency (RF) front ends 168. For example, the RF front ends 168 may comprise software-defined radios (SDRs) with phase-locked loop (PLL) modules that provide data representative of the incoming signal(s) and their associated modulation.

In some implementations the gateway antennas 166 may be configured to receive signals with two or more polarizations. For example, the gateway antennas 166 may be able to receive left-hand circularly polarized (LHCP) signals and right-hand circularly polarized (RHCP) signals. Continuing the example, separate receiver circuitry may be provided for each polarization. Such a configuration may be used to support cross-polarization (XPOL) modulation. In one implementation, cross-polarization may utilize signals encoding different data on the same frequency, but using different polarization. A process of cross-polarization interference cancellation (XPIC) may be performed using information from both polarizations to mitigate interference resulting from the use of the two polarizations.

In some implementations, each antenna may be associated with a specified frequency or frequency range. For example, a first antenna may be used to receive a first carrier signal on the uplink having a first carrier frequency and a second antenna may be used to receive a second carrier signal on the uplink having a second carrier frequency that is different from the first.

One or more modems 170 may be connected to the RF front end 168. During operation, the modems 170 may accept as input the data from the RF front end 168 and provide as output demodulated data. In some implementations, an array of modems 170 may be used. For example, the satellite 102 may use four modems 170 to accept the gateway uplink. These modems may be paired to facilitate XPIC. For example, the first modem 170(1) and third modem 170(3) may be paired to provide XPIC for the first carrier frequency while the second modem 170(2) and fourth modem 170(4) are paired to provide XPIC for the second carrier frequency. Data associated with the XPIC, such as in-phase (I) and quadrature (Q) or IQ data may be transferred between the paired modems 170 using respective data connections.

A network processor 172 is in communication with the modems 170. The network processor 172 may perform monitoring and control functions to direct operation of the modems 170. The network processor 172 may also accept the demodulated data produced by a modem 170 and pass that data on to other systems. For example, the demodulated data may be sent from the network processor 172 to a router. The router in turn may enque data for transmission via downlink to a particular UT 108.

Data connections between the modems 170 and the network processor 172 may be daisy-chained. In a normal operating configuration, the first modem 170(1) may have a first data connection with the network processor 172. The second modem 170(2) may be connected to the first modem 170(1) via a second data connection. Communication between the second modem 170(2) and the network processor 172 may be performed via the second data connection and the first data connection. Similarly, the third modem 170(3) may have a third data connection with the network processor 172. The fourth modem 170(4) may be connected to the third modem 170(3) via a fourth data connection. Communication between the fourth modem 170(4) and the network processor 172 may be performed via the fourth data connection and the third data connection. This is discussed in more detail with regard to FIG. 3.

In the event of a failure of a modem 170, a failover configuration may be used. The failover configuration may permit the satellite 102 to continue to receive gateway uplink data. The failover configuration discontinues XPIC and uses at least some of the data connections previously used to send IQ data to send other data to the network processor 172. This is discussed in more detail with regard to FIG. 4 and FIG. 5.

In some implementations hardware redundancy may be provided. For example, two or more network processors 172 may be provided, with one network processor 172 being sufficient for normal operation and the other reserved as a spare.

The gateways 106 are in communication with a management system 150. The management system 150 is also in communication, via the gateways 106, with the satellites 102 and the UTs 108. The management system 150 coordinates operation of the satellites 102, gateways 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data 164 that indicates when communication is to be transferred from the first satellite 102(1) to the second satellite 102(2). Continuing the example, the scheduling system 156 may also specify communication parameters such as frequency, timeslot indicative of when transmission is permitted, and so forth. These communication parameters may be associated with operation of a gateway uplink to the satellite 102, downlink from the satellite 102 to the UT 108, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular gateways 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, due to reset of one or more modems 170, and so forth.

The user terminal data 160 may comprise information such as a location of a particular UT 108. The user terminal data 160 may also include other information such as a priority assigned to data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2).

The scheduling system 156 may determine handover data 164 at regular intervals. For example, handover data 164 may be generated for handover assessment intervals that are five seconds long. In other implementations, the handover data 164 may be determined on demand, at irregular intervals, and so forth.

The UT 108 includes a communication system 180, such as a satellite network interface, to establish communication with one or more satellites 102. The communication system

180 of the UT 108 may include components similar to those of the communication system of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth.

The UT 108 passes data between the constellation of satellites 102 and the user device 110. The UT 108 may connect to the user device 110 using a second network interface. For example, the second network interface may comprise a wireless local area network, wired local area network, terrestrial wide area network, and so forth. The user device 110 may execute one or more application modules 198. The data includes upstream data sent by the user device 110 or downstream data that is addressed to the UT 108 or the user device 110. For example, during operation the application module 198 may send upstream data and receive downstream data. The upstream data and the downstream data each may comprise header data and payload data. The UT 108 may be fixed or in motion. For example, the UT 108 may be used at a residence, business, or on a vehicle such as a car, boat, aerostat, drone, airplane, and so forth.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite 102(2), time-of-flight correction, or other information associated with a specified time. The determination of the tracking data 186 may be ongoing. For example, the first UT 108 may determine tracking data 186 every 100 ms, every second, every five seconds, or at other intervals.

The UT 108 may send upstream data using the system 100. For example, the upstream data may originate from the UT 108, or may be received by the UT 108 from a user device 110. The upstream data may comprise a single packet or other unit of data transfer, or a plurality of packets or other units of data transfer. The upstream data may be addressed to a device. The device that the upstream data is addressed to may be accessible using one or more networks 144, such as the Internet.

The system 100 may include one or more PoP systems 146. Each PoP system 146 may comprise one or more servers or other computing devices. Separate PoP systems 146 may be located at different locations. In one implementation, a PoP system 146 may be associated with providing service to a plurality of UTs 108 that are located in a particular geographic region.

The PoP systems 146 may manage communication between the system 100 and the network 144. For example, a first PoP system 146 may receive the upstream data and send that upstream data to the network 144. In another example, the first PoP system 146 may receive the downstream data and proceed to attempt delivery of the downstream data to the UT 108.

The PoP system 146 is in communication with one or more gateways 106(1), 106(2), . . . , 106(G) and the management system 150. In some implementations one or more functions may be combined. For example, the PoP system 146 may perform one or more functions of the management system 150. In another example, the PoP system 146 may be included in an integrated gateway 106.

One or more servers 134 may communicate with the PoP system 146 via the network(s) 144. The servers 134 may provide various functions, such as content delivery, navigation, data storage and retrieval, and so forth. For example, the servers 134 may store video content that may be requested and streamed to a user device 110.

The satellite 102, the gateway 106, the user terminal 108, the user device 110, the management system 150, the PoP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more busses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus 216 may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a gateway 106, send telemetry to the gateway 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellant. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, gateways 106, user terminals 108, and so forth. The communication system 212 may include one or more modems, digital signal processors, power amplifiers, antennas (including at least one antenna that implements multiple antenna elements, such as a phased array antenna), processors, memories, storage devices, communications peripherals, interface buses, and so forth. Such components support communications with other satellites 102, gateways 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, demodulating, decoding, decompressing, error correction, and formatting. Data decoded by the communication system 212 may be output to other systems. Output from a system, such as the control system 204, may be provided to the communication system 212 for transmission.

The communication system 212 may include hardware to support the intersatellite link 196. For example, an intersatellite link FPGA 270 may be used to modulate data that is sent and received by an ISL transceiver 272 to send data between satellites 102. The ISL transceiver 272 may operate using radio frequencies, optical frequencies, and so forth.

The satellite 102 may maintain a gateway uplink using one or more of the gateway antennas 166, RF front end(s) 168, modems 170, network processor(s) 172, and so forth.

The satellite 102 may include one or more gateway antennas 166. For example, one or more parabolic antennas may be used to provide communication between the satellite 102 and one or more gateways 106. In another example, a phased array antenna may be used to provide communication between the satellite 102 and the UTs 108.

The RF front ends 168 may comprise one or more software-defined radios (SDRs) with phase-locked loop (PLL) modules that provide data representative of an incoming signal(s) and associated modulation.

The modems 170 may comprise one or more of DSPs, FPGAs, ASICs, and so forth that operate to demodulate a signal and produce demodulated data as output. The modems 170 may comprise additional elements, such as described below with regard to FIGS. 3-5.

The network processors 172 may comprise one or more of DSPs, FPGAs, ASICS, and so forth. The network processor 172 may perform monitoring and control functions to direct operation of the modems 170. The network processor 172 may also accept the demodulated data produced by a modem 170 and pass that data on to other systems.

The communication system 212 may comprise other modems 276. For example, one or more modems 276 may be used to generate signals based on input data to send data on a downlink from the satellite 102 to the gateway 106 or the UT 108.

One or more gateway downlink transmitters 280 may be used to transmit modulated signals, such as from a modem 276, from the satellite 102 to the gateway 106. In some implementations, the one or more gateway downlink transmitters 280 may share the use of the gateway antennas 166.

The satellite 102 may comprise one or more UT service antennas 282. The UT service antennas 282 or antenna elements may provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, gateway 106, and so forth. Likewise, the gain results in improved received signal strength at the satellite 102.

The beam provided by the UT service antennas 282 of the satellite 102 may comprise a plurality of subbeams. Subbeams on a satellite 102 may use different frequencies, timeslots, and so forth, to communicate with the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the Earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

One or more UT downlink transmitters 284 may be used to transmit a modulated signal from the satellite 102 to one or more of the UTs 108. The UT downlink transmitters 284 may share the use of the UT service antennas 282.

One or more UT uplink RF front ends 286 may comprise one or more software-defined radios (SDRs) with phase-locked loop (PLL) modules that provide data representative of an incoming signal(s) and associated modulation received from UTs 108. The UT uplink RF front end(s) 286 may share the use of the UT service antennas 282.

Figure 3:
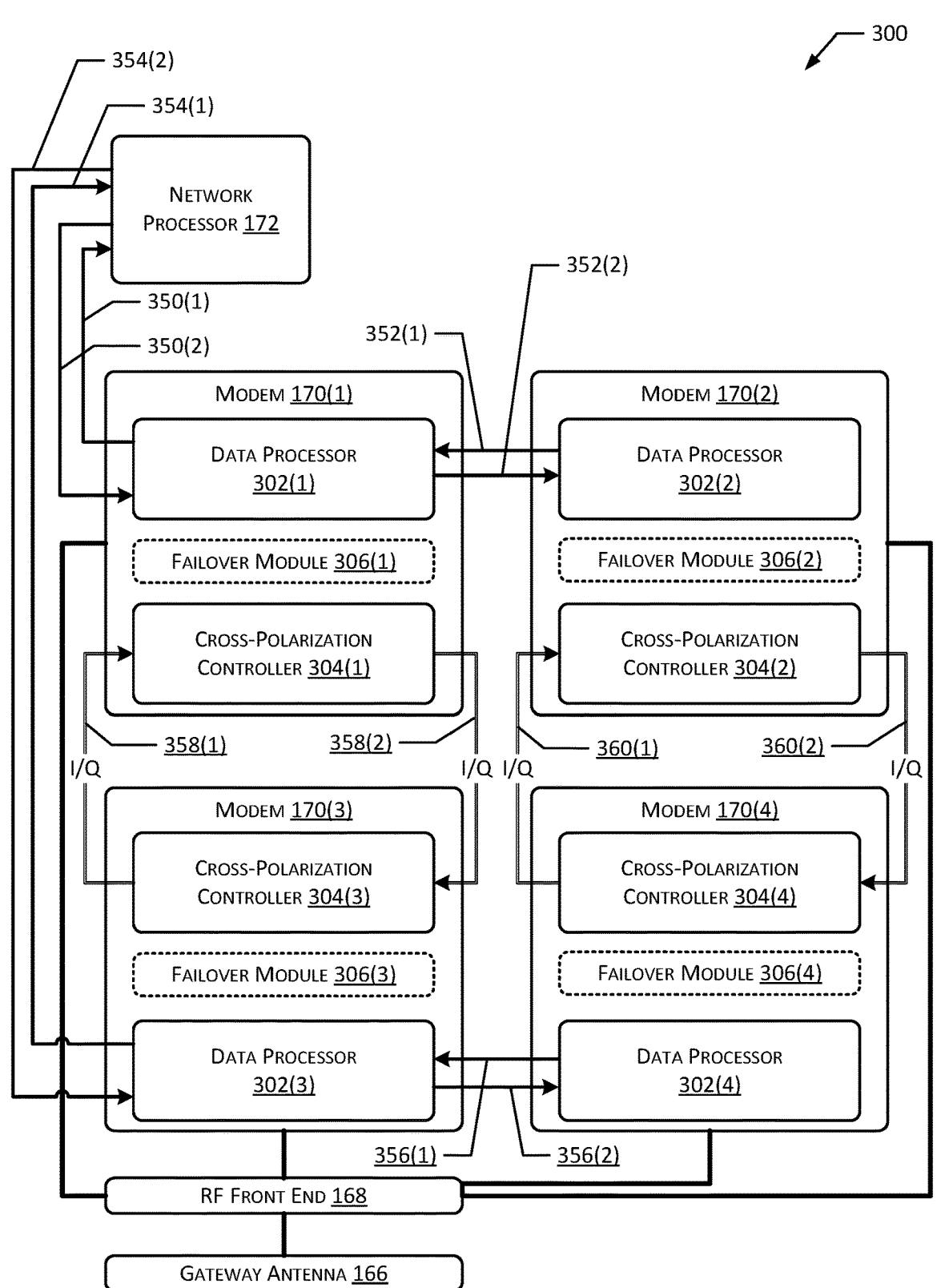
FIG. 3 illustrates a modem array during normal operation, according to some implementations.

FIG. 3 illustrates at 300 a modem array in a normal configuration, according to some implementations. In the implementation depicted, the modem array comprises modems 170(1)-(4).

The network processor 172 may include a plurality of data connections that may be used to communicate with modems 170 or other devices.

As described herein, a data connection may comprise a serial link, or "lane". The data connection may be bidirectional. For example, the data connection may include an input port that receives data to a device and an output port that transmits data to another device. In some implementations the data connection(s) may be compliant with the Interlaken interconnect protocol, originally promulgated by Cisco Systems, Inc.

Each modem 170 may comprise one or more functional modules. Some functional modules, such as modulators or demodulators, serializers, de-serializers, and so forth are not depicted. These functional modules may comprise analog circuitry, DSPs, ASICs, or other devices that perform their respective functions.

Each modem 170 may accept radio data from one or more of the RF front ends 168. For example, the data received from the RF front ends 168 may be representative of the incoming signal(s) and their associated modulation. As mentioned above, an RF front end 168 may be associated with a particular gateway antenna 166. The gateway antenna 166 may be equipped to acquire signals with different polarizations.

The modems 170 may include functional blocks such as a data processor 302, cross-polarization controller 304, and a failover module 306. Each modem 170 includes a plurality of data connections that may be used to communicate with other devices, such as other modems 170, the network processor(s) 172, or other devices.

The data processor 302 may coordinate operation of the data connections available to the modem 170. For example, the data processor 302 may read packet headers and route packets based on those packet headers. The data processor 302 may implement one or more routing rules. For example, incoming packets that have a packet header value indicative of "IQ data" may be directed to the cross-polarization controller 304. The data processor 302 may also maintain routing data indicative of which data connection a given device or associated address can be communicated with. The data processor 302 may receive packets having a destination address indicative of another device, such as another modem 170 or the network processor 172, and may forward those packets to the corresponding data connection indicated by the routing data.

The cross-polarization controller 304 coordinates the exchange of IQ data with another paired modem handling a complementary polarization. The cross-polarization controller 304 may use the locally determined IQ data and the IQ data received from the paired modem via a data connection to perform cross-polarization interference cancellation (XPIC).

In the configuration depicted here, a first data connection 350 connects the network processor 172 and the first modem 170(1). The first data connection 350 may comprise a pair of unidirectional links 350(1) and 350(2) that provide bidirectional communication. The other data connections described herein may be similarly configured.

A second data connection 352 connects the first modem 170(1) and the second modem 170(2). This provides a first "daisy-chain" connection, in which the network data transferred between the network processor 172 and the second modem 170(2) passes through the first modem 170(1).

A third data connection 354 connects the network processor 172 and the third modem 170(3).

A fourth data connection 356 connects the third modem 170(3) and the fourth modem 170(4). This provides a second "daisy-chain" connection, in which the network data transferred between the network processor 172 and the fourth modem 170(4) passes through the third modem 170(3).

A fifth data connection 358 connects the first modem 170(1) and the third modem 170(3). During normal operation, the fifth data connection 358 transfers IQ data between a first pair of modems 170.

A sixth data connection 360 connects the second modem 170(2) and the fourth modem 170(4). During normal operation, the sixth data connection 360 transfers IQ data between a second pair of modems 170.

The failover modules 306(1)-(4) may be unused during normal operation. The failover module 306 is discussed in more detail with regard to FIG. 4.

Figure 4:
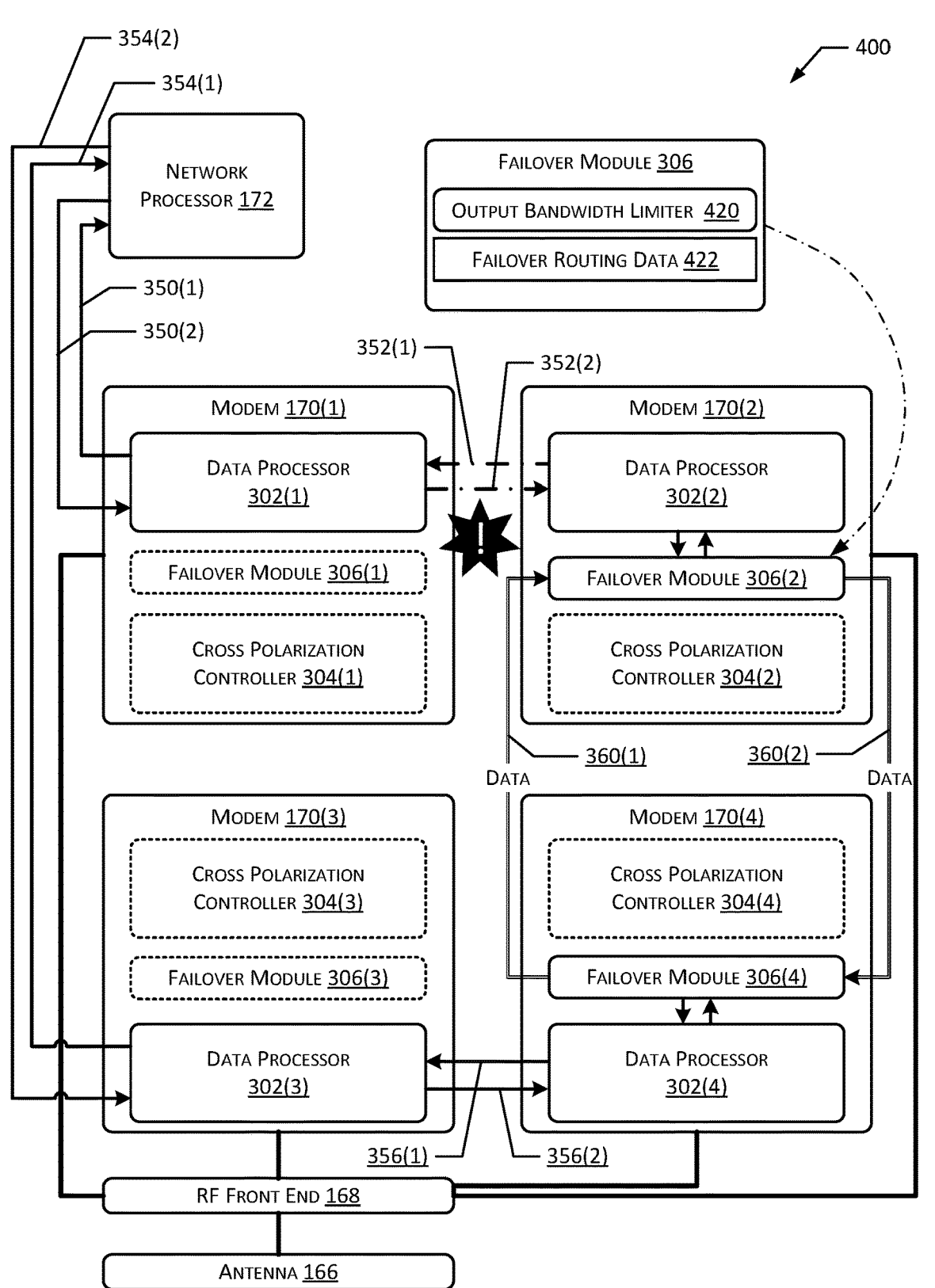
FIG. 4 illustrates a modem array in a failover configuration allowing continued operation after failure, according to some implementations.

FIG. 4 illustrates at 400 the modem array in a failover configuration allowing continued operation after failure, according to some implementations.

In this illustration, the second data connection 352 has failed. If no action were taken, the second modem 170(2) would be unable to communicate with the network processor 172.

Responsive to the failure, some data connections are reconfigured to provide a path for network data between the second modem 170(2) and the network processor 172. This reconfiguration may be implemented by changing one or more configuration settings, register values, and so forth. For example, the failover module 306(2) may set one or more register values to reassign transfer of network data from the port(s) associated with the second data connection 352(2) to the port(s) associated with the sixth data connection 360, as described below.

The transfer of IQ data between one or more pairs of modems is discontinued. The first modem 170(1) and the third modem 170(3) may cease sending IQ data via the fifth data connection 358. The second modem 170(2) and the fourth modem 170(4) may cease sending IQ data via the sixth data connection 360.

In some implementations, transfer of IQ data to support XPIC may be continued in modem pairs that maintain communication with the network processor 172. For example, the first modem 170(1) and the third modem 170(3) may continue sending IQ data via the fifth data connection 358 while in the failover configuration.

With the discontinuance of sending IQ data, the sixth data connection 360 may now be used to transfer network data.

The failover module 306 may comprise one or more of an output bandwidth limiter 420 or failover routing data 422. The output bandwidth limiter 420 may impose a specified bandwidth limit indicative of a maximum quantity of data per unit time that is sent from the second modem 170(2) to the fourth modem 170(4). The specified bandwidth limit value may be set to prevent saturation of data connections between the second modem 170(2) and the network processor 172. In some implementations, different threshold values of bandwidth limits may be specified for different modems 170. For example, a first threshold value may be used by the output bandwidth limiter 420 of the second modem 170(2) while a second threshold value may be used by the output bandwidth limiter 420 of the fourth modem 170(4). In some implementations, the first threshold value may differ from the second threshold value.

The failover routing data 422 may comprise information indicative of the route that packets are to traverse at least a portion of the modem array to reach a specified destination address, such as the network processor 172. For example, the failover routing data 422 may indicate that if the second data connection 352 fails, the route from the second modem 170(2) will be via the fourth modem 170(4) and the third modem 170(3).

While in the failover configuration, network data from the modem 170(2) is sent via the sixth data connection 360 to the fourth modem 170(4). The fourth modem 170(4) may then forward the network data to the third modem 170(3) using the fourth data connection 356. The third modem 170(3) may then forward the network data to the network processor 172 using the third data connection 354. Data from the network processor 172 to the second modem 170(2) may be sent via the same route, in the reverse order.

While in the failover configuration, cross-polarization operation may be curtailed. This may result in a reduction in the ability of the modems 170 to demodulate data. However, the modems 170 may still be able to continue operating in the failover configuration, providing some data throughput and avoiding a total link failure.

The satellite 102 may send a message to the transmitting station, such as the gateway 106, directing it to switch to a different modulation/coding scheme that is compatible with the failover configuration. For example, discontinue cross-polarization modulation on a specific frequency, reducing modulation rate, changing coding scheme, and so forth.

FIG. 4 illustrates the situation in which the second data connection 352 has failed. It is understood that the techniques described herein may be applied to failures of other data connections within the system 100. For example, a failure of the fourth data connection 356 may be tolerated by directing network data via the second data connection 352. In another example, a failure of the first data connection 350 may be tolerated by directing network data from the first modem 170(1) to the third modem 170(3) via the fifth data connection 358, and then to the network processor 172.

It is also understood that these techniques may be extended to further pairings of modems 170. For example, if the modem array comprises six modems 170, these techniques may be used to tolerate failure of a link in a "daisy-chain".

Figure 5:
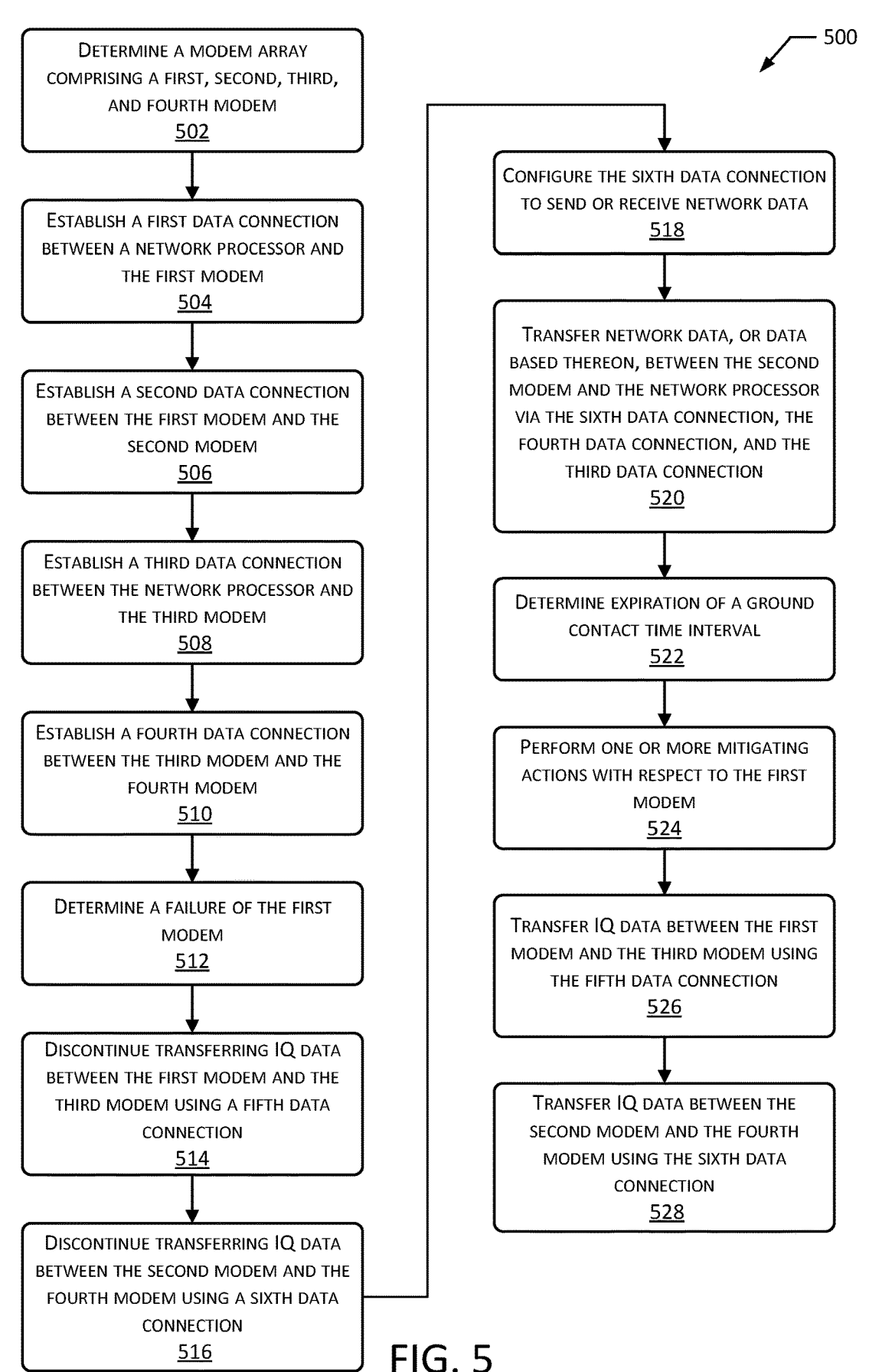
FIG. 5 is a flow diagram of a process to operate a modem array in a failover configuration, according to some implementations.

FIG. 5 is a flow diagram 500 of a process to operate a modem array in a failover configuration, according to some implementations. The process may be implemented by devices onboard the satellite 102.

At 502 a modem array onboard a satellite 102 is determined that comprises a first modem 170(1), a second modem 170(2), a third modem 170(3) and a fourth modem 170(4). In other implementations, the modem array may include other multiples of pairs of modems 170.

At 504 a first data connection 350 is established between the network processor 172 and the first modem 170(1). For example, the first data connection 350 may comprise a bidirectional serial communication. In some implementations the first data connection 350 may be compliant with the Interlaken interconnect protocol, originally promulgated by Cisco Systems, Inc.

At 506 a second data connection 352 is established between the first modem 170(1) and the second modem 170(2). For example, the second data connection 352 may comprise a bidirectional serial communication. In some implementations the second data connection 352 may be compliant with the Interlaken interconnect protocol.

At 508 a third data connection 354 is established between the network processor 172 and the third modem 170(3). For example, the third data connection 354 may comprise a bidirectional serial communication. In some implementations the third data connection 354 may be compliant with the Interlaken interconnect protocol.

At 510 a fourth data connection 356 is established between the third modem 170(3) and the fourth modem 170(4). For example, the fourth data connection 356 may comprise a bidirectional serial communication. In some implementations the fourth data connection 356 may be compliant with the Interlaken interconnect protocol.

At 512 a failure of the first modem 170(1) or a failure associated with communication with the second modem 170(2) is determined. For example, the failure may be determined responsive to a time interval since last data received by the network processor 172 from one or more of the first modem 170(1) or the second modem 170(2) exceeding a threshold value. The last data received may comprise one or more of: a heartbeat signal or network data. In another example, the failure may be determined by a modem 170 which then sends data indicative of the failure to other devices such as the network processor 172 or another modem 170.

Failures may result from one or more of hardware or software faults. For example, a failure may result from a single-event upset due to ionizing radiation. In another example, a software fault may result in a failure.

In some situations, the failure may comprise a loss of communication. For example, a failure of the first modem 170(1) to transfer traffic between the network processor 172 and the second modem 170(2) may comprise a failure. In another example a failure may comprise the second data connection 352 being unable to send, receive, or send and receive data. In some implementations, the data processor 302 onboard a modem 170 may determine a failure.

At 514 transferring of IQ data associated with XPIC between the first modem 170(1) and the third modem 170(3) using a fifth data connection 358 is discontinued. As described above, in some implementations the fifth data connection 358 may be compliant with the Interlaken interconnect protocol.

At 516 transferring of IQ data associated with XPIC between the second modem 170(2) and the fourth modem 170(4) using a sixth data connection 360 is discontinued. As described above, in some implementations the sixth data connection 360 may be compliant with the Interlaken interconnect protocol.

At 518 the sixth data connection 360 is configured to transfer network data. For example, the network data may comprise control data, demodulated data, and so forth.

At 520 network data is transferred between the second modem 170(2) and the network processor 172 via the sixth data connection 360, the fourth data connection 356, and the third data connection 354.

In some implementations, the second modem 170(2) may limit output bandwidth to the fourth modem 170(4) to a specified bandwidth limit value. The fourth modem 170(4) may limit output bandwidth to the second modem 170(2) to a specified bandwidth limit value. The specified bandwidth limit value may be set to prevent saturation of data connections between the second modem 170(2) and the network processor 172.

Following operation 520, the system 100 may be deemed to be in the failover configuration. In one implementation, the transition to the failover configuration may be directed by one or more of the network processor 172 or other devices. For example, if the network processor 172 determines the failure, it may send instructions to the modems 170(1)-(4) to reconfigure to the failover configuration.

In another implementation the transition to the failover may be ad hoc. For example, when a modem 170 determines a failure it may configure itself to its portion of the failover configuration. Other devices, upon communication with the modem 170 that has reconfigured itself, may reconfigure themselves in response. This may be implemented using one or more of control packets sent via the data connections, or by inspection of the data packets. The packets transferred on the data connections may include header and payload information. The header information may indicate a source address, destination address, priority, payload type, and so forth. The payload may comprise information such as network data, IQ data, control data, demodulated data, and so forth. A receiving device may modify behavior based on the information included in the packets. For example, during normal operation modem 170(2) sends IQ data as packets with a first packet header value to modem 170(4) using the sixth data connection 360. The first packet header value is indicative of "IQ data". When modem 170(2) determines a failure in the second data connection 352, it stops sending IQ data on the sixth data connection 360 and begins sending network data to modem 170(4). The network data is sent as packets with a second packet header value that is indicative of "network data". Modem 170(4) receives these packets and determines, based on the packet header value, that they no longer contain IQ data and also indicate a destination address of the network processor 172. Responsive to this, modem 170(4) forwards these packets to modem 170(3) using the fourth data connection 356, which in turn forwards those packets to the network processor 172.

At 522 expiration of a ground contact time interval is determined. For example, the satellite 102 may receive handover data 164 indicative of a transfer of service from one gateway 106 to another at a first time. In another example, the satellite 102 may determine the time when a ground contact window expires.

At 524 one or more mitigating actions are performed with respect to the second modem 170(2). For example, the network processor 172 may send instructions to initialize the second modem 170(2) or a portion thereof, cycle power to the second modem 170(2), and so forth. The mitigating actions may be performed based on the expiration of the ground contact time interval, performing the mitigating actions on or after the ground contact window ends.

At 526 the system resumes transfer of IQ data associated with XPIC between the first modem 170(1) and the third modem 170(3) using the fifth data connection 358.

At 528 the system resumes transfer of IQ data associated with XPIC between the second modem 170(2) and the fourth modem 170(4) using the sixth data connection 360.

The system may now be deemed to be in the normal operation configuration.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver or other global navigation satellite system may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A satellite comprising:

a first antenna;

a radio-frequency (RF) front end connected to the first antenna, wherein the RF front end comprises one or more receivers;

a first modem, a second modem, a third modem, and a
  fourth modem, wherein:
  each modem is connected to the RF front end; and
a first processor executing instructions to:
  establish a first data connection between the first pro-
    cessor and the first modem;
  establish a second data connection between the first
    modem and the second modem;
  establish a third data connection between the first
    processor and the third modem;
  establish a fourth data connection between the third
    modem and the fourth modem;
  determine a failure associated with at least a portion of
    the first modem;
  discontinue transferring first data associated with cross-
    polarization interference cancellation (XPIC)
    between the first modem and the third modem using
    a fifth data connection;
  discontinue transferring second data associated with
    XPIC between the second modem and the fourth
    modem using a sixth data connection; and
  transfer network data between the second modem and
    the first processor via the sixth data connection, the
    fourth data connection, and the third data connection.
  2. The satellite of claim 1, the first processor executing
instructions to:
  receive data indicative of expiration of a ground contact
    time interval;
  perform, based on the expiration, one or more actions
    associated with the second modem;
  transfer third data associated with XPIC between the first
    modem and the third modem using the fifth data
    connection;
  transfer fourth data associated with XPIC between the
    second modem and the fourth modem using the sixth
    data connection; and
  transfer the network data between the second modem and
    the first processor via the second data connection and
    the first data connection.
  3. The satellite of claim 1, wherein:
  the second modem limits output bandwidth of first net-
    work data sent from the second modem to the fourth
    modem via the sixth data connection to less than a first
    threshold value; and
  the fourth modem limits output bandwidth of second
    network data sent from the fourth modem to the second
    modem via the sixth data connection to less than a
    second threshold value.
  4. The satellite of claim 1, wherein the first, second, third,
fourth, fifth, and sixth data connections are bidirectional
serial communications.
  5. The satellite of claim 1, wherein the second data
associated with XPIC is associated with a first packet header
value and the network data is associated with a second
packet header value, the satellite further comprising:
  a second processor associated with the fourth modem, the
    second processor to execute instructions to:
    determine that the network data received using the sixth
      data connection is associated with the second packet
      header value; and
    send the network data received using the sixth data
      connection to the fourth data connection.
  6. The satellite of claim 1, wherein to determine the
failure, the first processor further executes instructions to:
  determine that a first time interval has elapsed since
    receipt of last data from the second modem; and determine that the first time interval exceeds a threshold
  value;
wherein the last data is one or more of: a heartbeat signal
  or network data.
  7. The satellite of claim 1, wherein the failure is indicative
of a loss of the second data connection.
  8. A method comprising:
  establishing a first data connection between a first pro-
    cessor and a first modem;
  establishing a second data connection between the first
    modem and a second modem;
  establishing a third data connection between the first
    processor and a third modem;
  establishing a fourth data connection between the third
    modem and a fourth modem;
  determining a failure associated with the first modem;
  discontinuing sending first data associated with cross-
    polarization interference cancellation (XPIC) between
    the first modem and the third modem using a fifth data
    connection;
  discontinuing sending second data associated with XPIC
    between the second modem and the fourth modem
    using a sixth data connection;
  and
  transferring network data between the second modem and
    the first processor via the sixth data connection, the
    fourth data connection, and the third data connection.
  9. The method of claim 8, further comprising:
  determining expiration of a ground contact time interval;
  performing, based on the expiration, one or more actions
    associated with the second modem;
  transferring third data associated with XPIC between the
    first modem and the third modem using the fifth data
    connection;
  transferring fourth data associated with XPIC between the
    second modem and the fourth modem using the sixth
    data connection; and
  transferring the network data between the second modem
    and the first processor via the second data connection
    and the first data connection.
  10. The method of claim 8, further comprising:
  limiting output bandwidth of the second modem for first
    network data sent from the second modem to the fourth
    modem via the sixth data connection to less than a first
    threshold value; and
  limiting output bandwidth of the fourth modem for second
    network data sent from the fourth modem to the second
    modem via the sixth data connection to less than a
    second threshold value.
  11. The method of claim 8, wherein the second data
associated with XPIC is associated with a first packet header
value and the network data is associated with a second
packet header value; and
  the method further comprising:
    determining, at the fourth modem, that third data
      received using the sixth data connection is associated
      with the second packet header value; and
    sending, from the fourth modem, the third data received
      using the sixth data connection to the fourth data
      connection.
  12. The method of claim 8, the determining the failure
comprising:
  determining that a time interval has elapsed since receipt
    of last data from the second modem; and
  determining that the time interval exceeds a threshold
    value;

wherein the last data is one or more of: a heartbeat signal or network data.

13. The method of claim 8, wherein the failure is indicative of a loss of the second data connection.

14. A satellite comprising:

an antenna;

a radio-frequency (RF) front end connected to the antenna;

a first modem, a second modem, a third modem, and a fourth modem, wherein each modem is connected to the RF front end;

a first processor executing instructions to:

establish a first data connection between the first processor and the first modem;

establish a second data connection between the first modem and the second modem;

establish a third data connection between the first processor and the third modem;

establish a fourth data connection between the third modem and the fourth modem;

determine a failure associated with at least a portion of the first modem;

discontinue transferring first data associated with cross-polarization interference cancellation (XPIC) between the first modem and the third modem using a fifth data connection;

discontinue transferring second data associated with XPIC between the second modem and the fourth modem using a sixth data connection; and transfer network data between the second modem and the first processor via the sixth data connection, the fourth data connection, and the third data connection.

15. The satellite of claim 14, the first processor executing instructions to:

receive data indicative of expiration of a ground contact time interval;

perform, based on the expiration, one or more actions associated with the second modem;

transfer third data associated with XPIC between the first modem and the third modem using the fifth data connection;

transfer fourth data associated with XPIC between the second modem and the fourth modem using the sixth data connection; and transfer the network data between the second modem and the first processor via the second data connection and the first data connection.

16. The satellite of claim 14, wherein:

the second modem limits output bandwidth of first network data sent from the second modem to the fourth modem via the sixth data connection to less than a first threshold value; and the fourth modem limits output bandwidth of second network data sent from the fourth modem to the second modem via the sixth data connection to less than a second threshold value.

17. The satellite of claim 14, wherein the first, second, third, fourth, fifth, and sixth data connections are bidirectional serial communications.

18. The satellite of claim 14, wherein the second data associated with XPIC is associated with a first packet header value and the network data is associated with a second packet header value, the satellite further comprising;

a second processor associated with the fourth modem, the second processor to execute instructions to:

determine that the network data received using the sixth data connection is associated with the second packet header value; and send the network data received using the sixth data connection to the fourth data connection.

19. The satellite of claim 14, wherein to determine the failure, the first processor further executes instructions to:

determine a first time interval has elapsed since receipt of last data from the second modem; and determine that the first time interval exceeds a threshold value; wherein the last data is one or more of: a heartbeat signal or network data.

20. The satellite of claim 14, wherein the failure is indicative of a loss of the second data connection.

* * * * *